US010899273B2

(12) United States Patent
Nykerk et al.

(10) Patent No.: US 10,899,273 B2
(45) Date of Patent: Jan. 26, 2021

(54) INTEGRATED DISPLAY LIGHT ASSEMBLY

(71) Applicant: Flex-N-Gate Advanced Product Development, LLC, Tecumseh (CA)

(72) Inventors: Todd Nykerk, Holland, MI (US); Les Sullivan, Wyoming, MI (US)

(73) Assignee: Flex-N-Gate Advanced Product Development LLC, Tecumseh (CA)

( * ) Notice: Subject to any disclaimer, the term of this patent is extended or adjusted under 35 U.S.C. 154(b) by 0 days.

(21) Appl. No.: 16/170,662

(22) Filed: Oct. 25, 2018

(65) Prior Publication Data

US 2019/0168663 A1 Jun. 6, 2019

Related U.S. Application Data

(60) Provisional application No. 62/594,274, filed on Dec. 4, 2017.

(51) Int. Cl.
*B60Q 1/00* (2006.01)
*B60Q 1/50* (2006.01)
*F21S 43/20* (2018.01)
*B60R 13/10* (2006.01)
*G09F 21/04* (2006.01)
*G09F 13/00* (2006.01)
(Continued)

(52) U.S. Cl.
CPC ............. *B60Q 1/50* (2013.01); *B60R 13/10* (2013.01); *B60R 25/104* (2013.01); *F21S 43/26* (2018.01); *G09F 13/005* (2013.01); *G09F 21/04* (2013.01); *B60Q 2900/30* (2013.01); *G09F 2013/222* (2013.01)

(58) Field of Classification Search
None
See application file for complete search history.

(56) References Cited

U.S. PATENT DOCUMENTS

| 5,652,565 | A | * | 7/1997 | Salcedas | B60Q 1/302 340/467 |
| 6,404,334 | B1 | * | 6/2002 | Chao | B60Q 1/22 340/464 |
| 9,007,193 | B2 | | 4/2015 | Boston et al. | |

(Continued)

FOREIGN PATENT DOCUMENTS

WO 99/30925 A1 6/1999

OTHER PUBLICATIONS

PCT Patent Application PCT/US2018/059752 International Search Report and Written Opinion dated Mar. 28, 2019.

*Primary Examiner* — Julie B Lieu
(74) *Attorney, Agent, or Firm* — Erise IP, P.A.

(57) ABSTRACT

An integrated display-light assembly for a vehicle includes a lamp housing for mechanically supporting an outer lens. A light source is positioned within the lamp housing behind a first portion of the outer lens. A display device is positioned within the lamp housing behind a second portion of the outer lens, different than the first portion. The display device illuminates a changeable visual content visible through the outer lens. The display device may be adapted for displaying digital images received from a controller. The light source may provide an automotive lighting function. The outer lens is positioned externally beside the display device and the light source for providing protection from external environmental conditions. The lamp housing is adapted to support the display device, the light source, and the outer lens.

19 Claims, 4 Drawing Sheets

(51) Int. Cl.
  *B60R 25/104*  (2013.01)
  *G09F 13/22*  (2006.01)

(56) References Cited

U.S. PATENT DOCUMENTS

| | | | |
|---|---|---|---|
| 9,221,342 B2 | 12/2015 | Dehmann | |
| 9,663,028 B2* | 5/2017 | Parkes | B60Q 1/503 |
| 9,663,043 B2 | 5/2017 | Belegu | |
| 10,160,380 B1* | 12/2018 | Salter | F21V 23/0435 |
| 10,443,790 B2 | 10/2019 | George et al. | |
| 2003/0043314 A1* | 3/2003 | Lee | G02B 6/0065 |
| | | | 349/65 |
| 2003/0164370 A1* | 9/2003 | Aihara | H05B 6/1218 |
| | | | 219/622 |
| 2005/0128065 A1* | 6/2005 | Kolpasky | G09F 21/04 |
| | | | 340/461 |
| 2005/0201080 A1* | 9/2005 | Seward | A47C 7/725 |
| | | | 362/97.2 |
| 2006/0213100 A1* | 9/2006 | McCann | B60R 13/00 |
| | | | 40/591 |
| 2007/0132748 A1* | 6/2007 | Choi | G09G 3/002 |
| | | | 345/204 |
| 2007/0285361 A1 | 12/2007 | Jovanovich | |
| 2008/0158510 A1 | 7/2008 | Tant et al. | |
| 2008/0258938 A1 | 10/2008 | Moon | |
| 2009/0299857 A1* | 12/2009 | Brubaker | G06Q 30/02 |
| | | | 705/14.66 |
| 2011/0128212 A1 | 6/2011 | Kothari et al. | |
| 2013/0006775 A1* | 1/2013 | Jordan | G08G 1/20 |
| | | | 705/14.62 |
| 2016/0140614 A1 | 5/2016 | Brubaker | |
| 2017/0305336 A1 | 10/2017 | Parkes | |
| 2017/0314759 A1 | 11/2017 | Nykerk et al. | |
| 2018/0215435 A1* | 8/2018 | Iwamoto | G06F 3/147 |
| 2018/0252403 A1 | 9/2018 | Hamid et al. | |
| 2018/0274745 A1 | 9/2018 | Nykerk et al. | |
| 2019/0309924 A1 | 10/2019 | Nykerk et al. | |

* cited by examiner

INTEGRATED DISPLAY LIGHT ASSEMBLY

CROSS-REFERENCE TO RELATED APPLICATIONS

This application claims the benefit of U.S. Provisional Patent Application Ser. No. 62/594,274 entitled Integrated Display Light Assembly and filed Dec. 4, 2017, the disclosure of which is herein incorporated by reference in its entirety.

BACKGROUND

1. Field of the Disclosure

Embodiments of this disclosure relate generally to the field of light assemblies for use in vehicles. More specifically, embodiments of this disclosure include changeable displays integrated within vehicle light assemblies.

2. Description of the Related Art

Many different types of displays for use on the exterior of a vehicle have been described in the prior art. U.S. Patent Publication 2017/0305336 to Parkes discloses a display system for rendering content on the exterior of a vehicle. U.S. Patent Publication 2006/0213100 to McCann discloses an electronic display system for mounting on a vehicle. U.S. Patent Publication 2008/0258938 to Moon discloses a digital plate system for displaying registration data on a vehicle. U.S. Pat. No. 9,221,342 to Dehmann discloses an apparatus and method for displaying graphical content in different modes based on vehicle speed. U.S. Pat. No. 9,663,043 to Belegu discloses an electronic license plate for a vehicle having a visual display screen.

SUMMARY

In an embodiment, an integrated display-light assembly for a vehicle is provided. The integrated display-light assembly includes a lamp housing for mechanically supporting an outer lens. A light source is positioned within the lamp housing behind a first portion of the outer lens. A display device is positioned within the lamp housing behind a second portion of the outer lens, different than the first portion. The display device illuminates a changeable visual content visible through the outer lens.

In another embodiment, an external vehicle lamp assembly includes a display device adapted for displaying digital images received from a controller. A light source is located adjacent the display device for providing an automotive lighting function. An outer lens is positioned externally beside the display device and the light source for providing protection from external environmental conditions. A lamp housing is adapted to support the display device, the light source, and the outer lens.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

In certain lighting applications, markings may be incorporated into a light assembly for producing a desired visual effect. Some examples of markings include logos, designs, emblems, geometric shapes, graphics, text, etc. Typically, markings of a light assembly are static. In other words, the appearance of the markings may alter when the light assembly transitions between lit and unlit states, but otherwise the markings maintain a constant appearance (e.g., a constant logo, design, emblem, geometric shape, graphic, text, etc.). Also, markings of a light assembly are typically fixed. In other words, a marking incorporated into a light assembly remains the same throughout the lifetime of the light assembly.

Embodiments of the present disclosure provide a light assembly having a changeable display to provide customizable markings, as well as other forms of visual content. Customizable markings enable the marking to change from one logo to a different logo, for example, or to change between a logo, a design, an emblem, a geometric shape, a graphic, text, an image, etc. By changing text, personalized messaging may be employed. In an embodiment, the display is used to project a license plate, which could be used to replace or supplement a traditional metal license plate fixed to a vehicle. In addition to markings, visual content of other forms may be provided by a changeable display, including but not limited to animation, pictures, and video. The changeable display may provide visual arrangements that combine markings with visual content. Changing what is displayed may be via an automated process or a selectable process, or a combination of automated and selectable processes.

Incorporating markings into vehicle light assemblies is complicated by photometric requirements of particular vehicle lights. For example, vehicle brake light assemblies must provide a specific total illumination surface area and illumination intensity. Embodiments of the present disclosure may be used to provide multiple functions from the same device, such as vehicle tail function, stop function, and welcome function.

Figure 1:
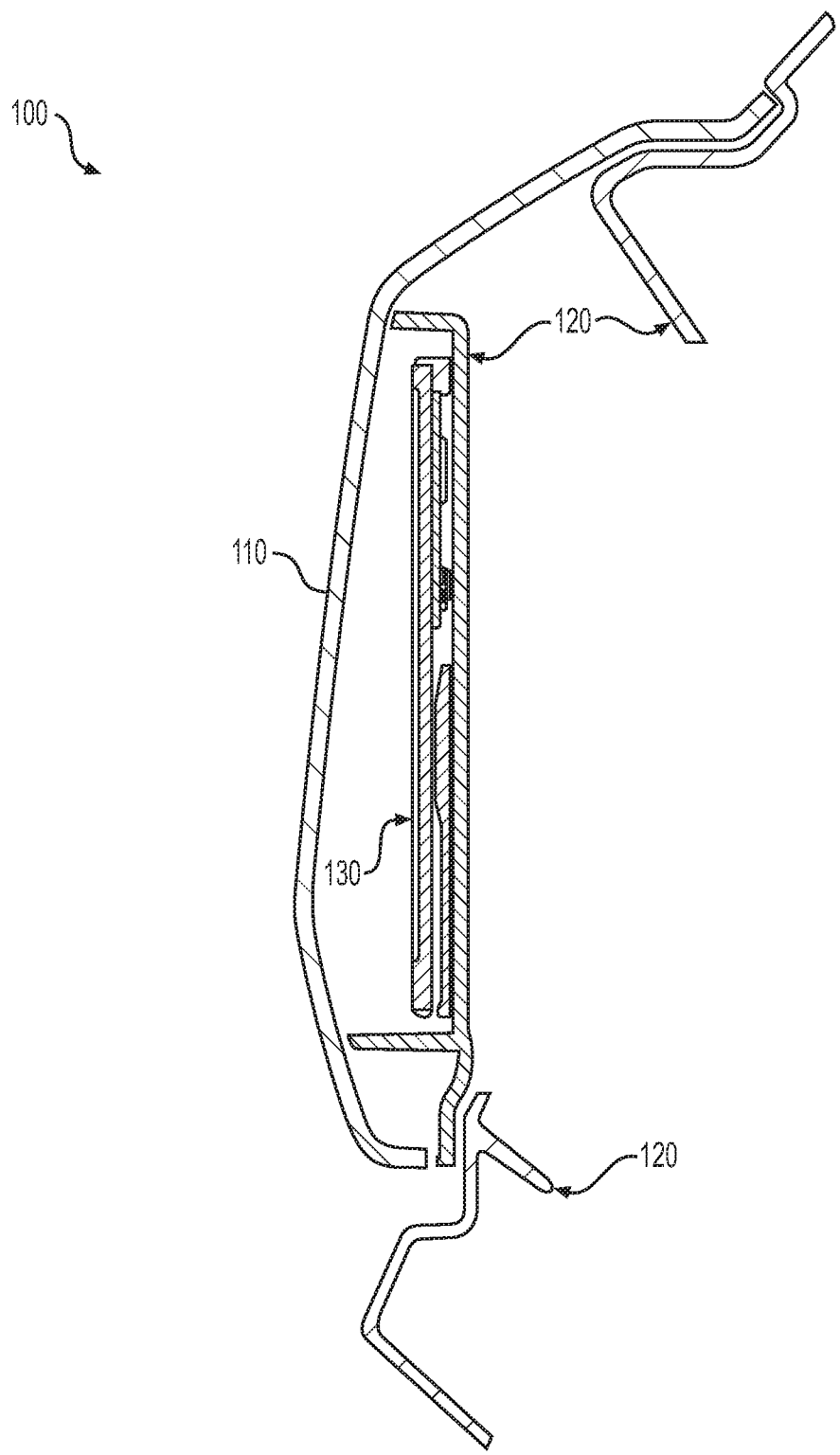
FIG. 1 shows a cross-sectional side view of an integrated display light assembly, in an embodiment.

FIG. 1 shows a cross-sectional side view of an exemplary integrated display light assembly 100. In an embodiment, the side view depicted in FIG. 1 represents a cross-section at or near a center of a lift-gate lamp assembly of a vehicle. However, the same basic arrangement, including minor variations thereof, may be used to provide an integrated display light assembly for other lighting applications.

Light assembly 100 includes an outer lens 110, a lamp housing 120, and a display device 130. Outer lens 110 is made of a transparent material configured to protect display device 130 and optionally a light source (not shown) while allowing light from the display device and/or light source to pass through. Lamp housing 120 provides structural support for securing display device 130, and optionally the light source, within the light assembly 100. In certain embodiments, outer lens 110 includes a first portion covering a display device 130 and a second portion covering one or more light sources (see e.g., FIG. 3).

Display device 130 is positioned behind outer lens 110 such that the visual content produced by display device 130 is easily visible to an observer viewing light assembly 100.

In certain embodiments, a display device 130 is integrated into a lift-gate, applique, or rear combination lamp (RCL) assembly of a vehicle. Display device 130 is for example a digital display such as backlit display panel, a liquid crystal display (LCD), or an organic light-emitting diode (OLED) display. Alternatively, display device 130 includes an array of light emitting diodes (LEDs) or ultra-LEDs (ULEDs), or another display technology. In certain embodiments, display device 130 is a digital display capable of being programmed to display personalized visual content, such as customizable markings, welcome features, or notifications, as further described below in connection with FIG. 4. In an embodiment, display device 130 is a gen4-uLCD-70D series intelligent display module from 4D Systems (Minchinbury, Australia).

Figure 2:
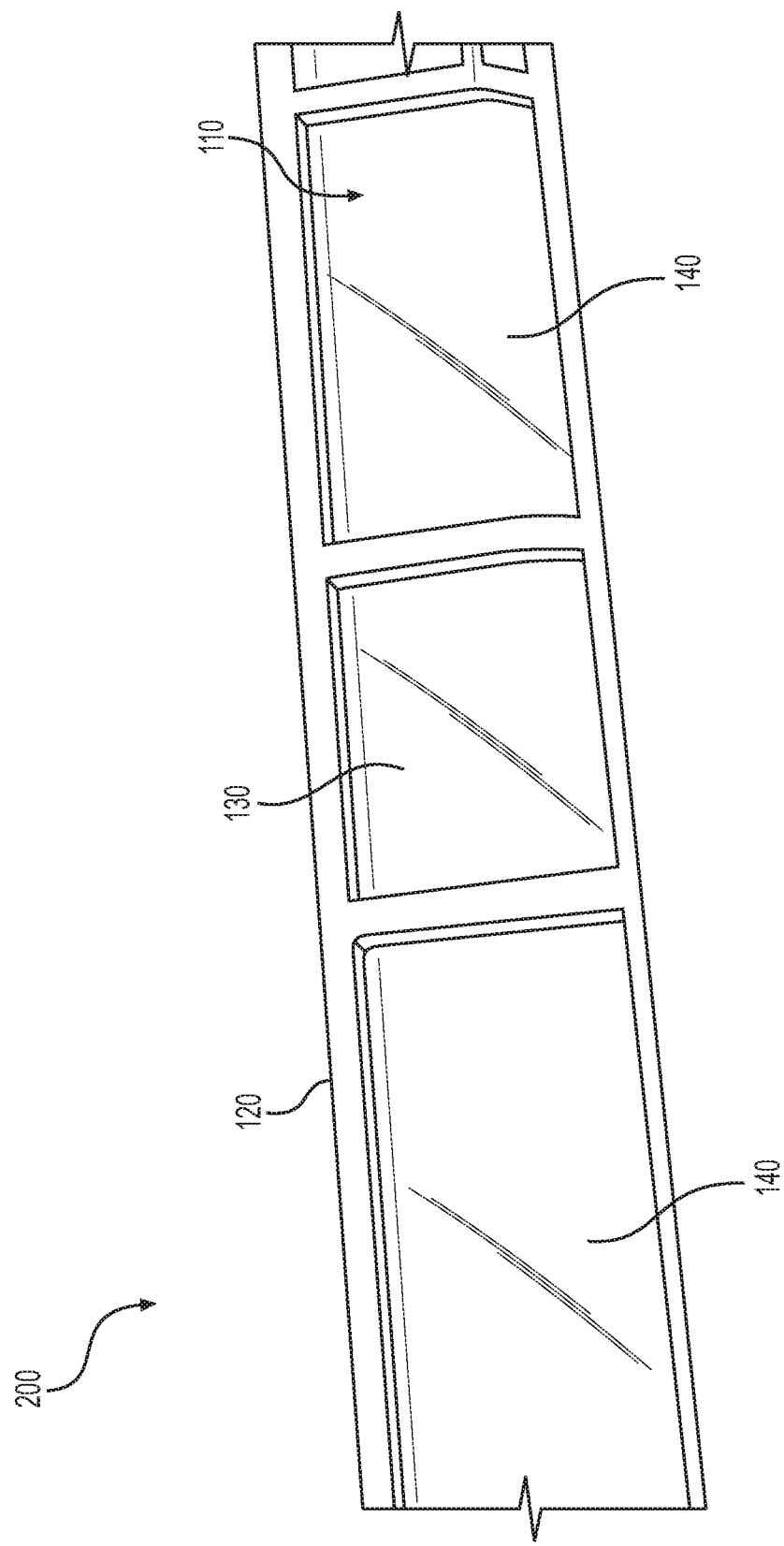
FIG. 2 is a perspective view of an integrated display light assembly, in an embodiment.

FIG. 2 is a perspective view of an integrated display light assembly 200. Light assembly 200 is an example of light assembly 100, FIG. 1 having outer lens 110, lamp housing 120, and display device 130. Outer lens 110 is made of a transparent material to protect, and allow light to pass from, display device 130 and an optional light source 140.

In the embodiment depicted in FIG. 2, display device 130 is located centrally between a pair of light sources 140. In other words, display device 130 is positioned behind a first portion of outer lens 110, whereas the pair of light sources 140 are each positioned behind a second portion and a third portion of outer lens 110, respectively. Light sources 140 may include a plurality of light emitting devices, such as incandescent bulbs, halogen lamps, light-emitting diodes (LEDs) or other types of lights. In certain embodiments, outer lens 110 may include more than one lens. For example, each of light sources 140 and display device 130 may be positioned behind independent outer lenses.

Figure 3:
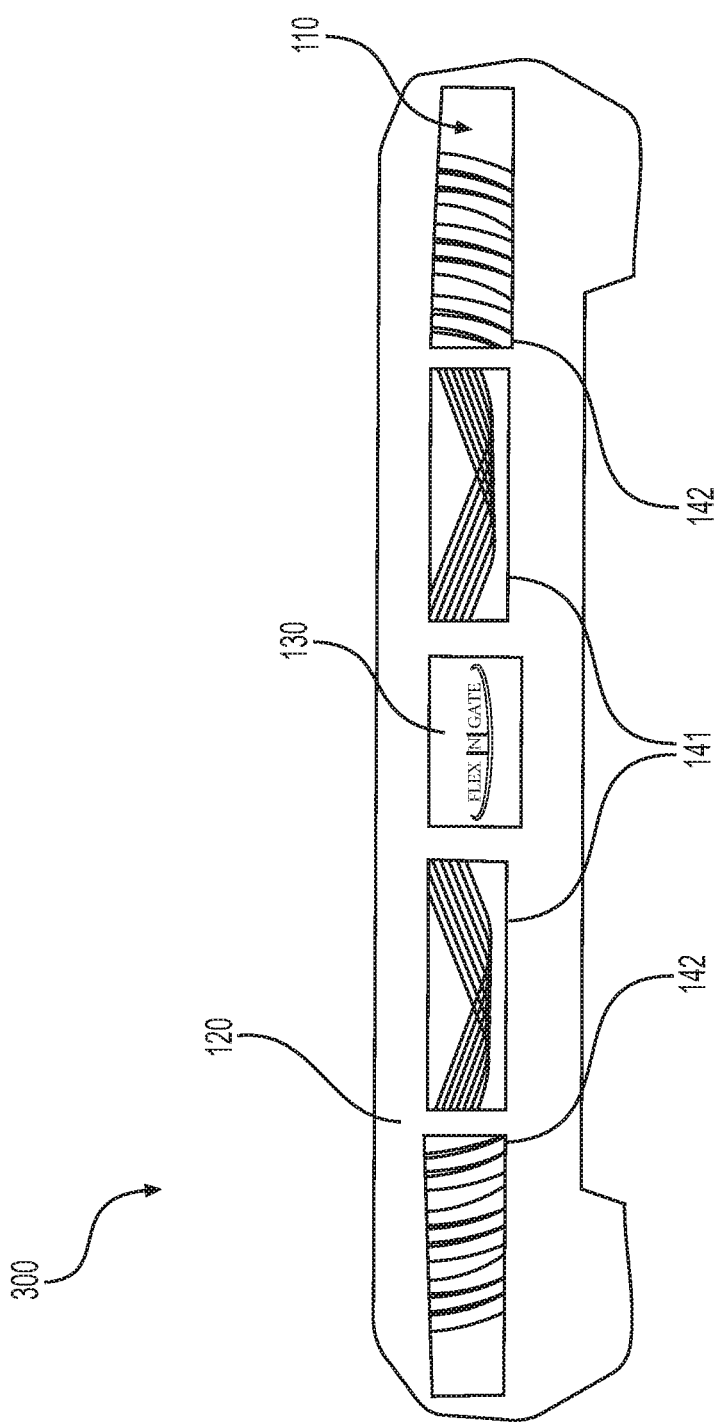
FIG. 3 shows an illuminated front view of an integrated display light assembly, in an embodiment.

FIG. 3 shows an illuminated front view of an exemplary integrated display light assembly 300. Light assembly 300 is an example of light assembly 100, FIG. 1 having outer lens 110, lamp housing 120, and display device 130. Outer lens 110 is made of a transparent material to protect and allow light to pass from display device 130 and any light sources.

In the embodiment depicted in FIG. 3, display device 130 is located centrally between two pairs of light sources, an inner pair of light sources 141 and an outer pair of light sources 142. Inner and outer pairs of light sources 141, 142 may include a plurality of light emitting devices, such as incandescent bulbs, halogen lamps, light-emitting diodes (LEDs) or other types of lights. Display device 130 may for example illuminate a marking (e.g., a manufacturer logo) visible through outer lens 110. The marking may be changeable, as described below in connection with FIG. 4.

Control of integrated display light assembly 100 may be via a variety of methods with a corresponding variety of complexity depending on a desired level of available control. For example, control of light assembly 100 may be via an automated process or a selectable process, or a combination of automated and selectable processes. Automated processes may include triggering of a switch by coupling the switch to another device (e.g., a sensor that detects ambient light). Selectable processes may include triggering of a switch by a user input, such as through a user input device accessed within the vehicle cabin or remotely (e.g., via a key fob or other mobile device). More complex control options may rely on a controller having programmable software such as that described below in connection with FIG. 4.

Figure 4:
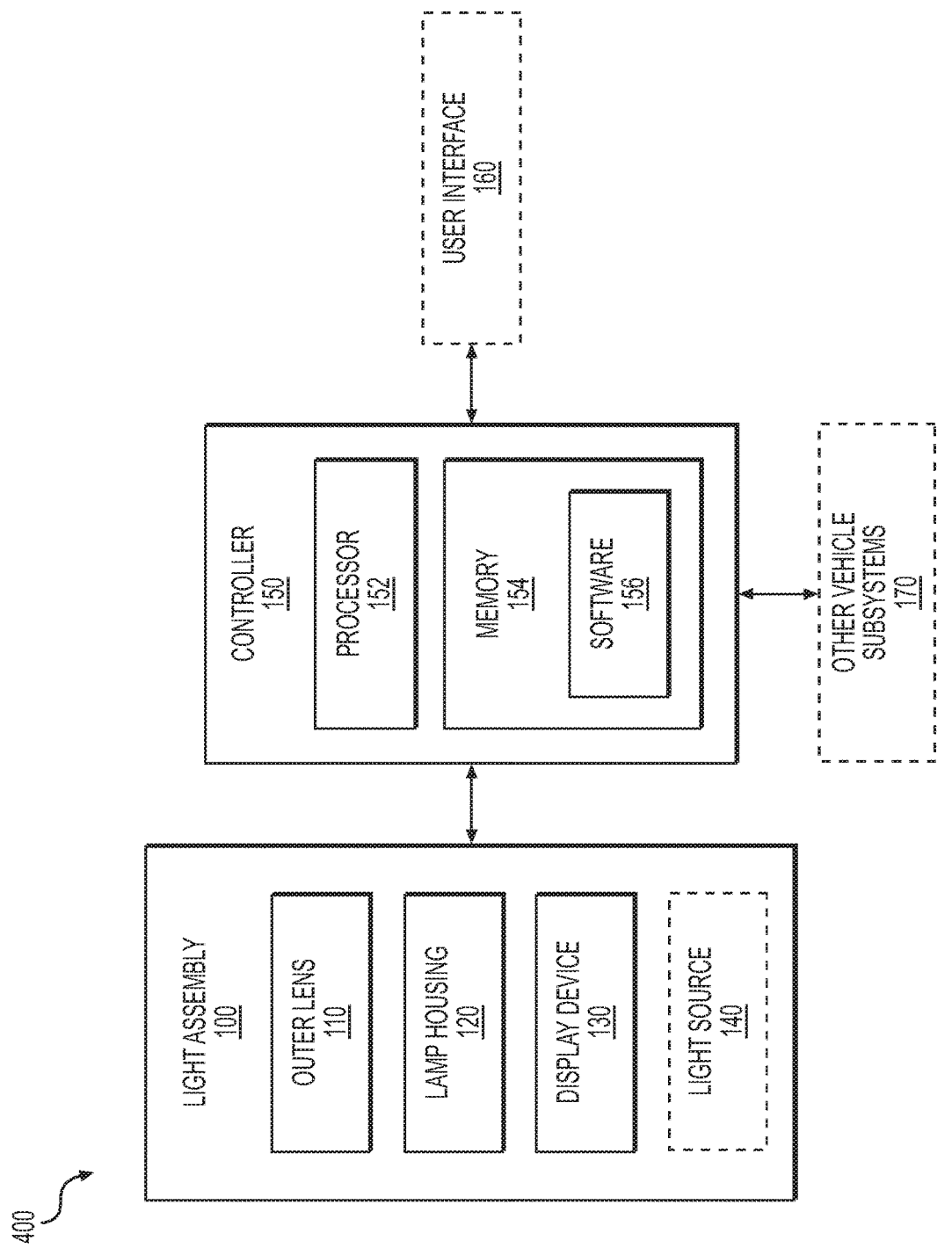
FIG. 4 is a block diagram showing a system for controlling an integrated display light assembly, in an embodiment.

FIG. 4 is a block diagram showing components of an exemplary system 400 for controlling integrated display light assembly 100. System 400 includes a controller 150, which is for example a computer, microcontroller, microprocessor, or programmable logic controller (PLC) having a memory 154, including a non-transitory medium for storing software 156, and a processor 152 for executing instructions of software 156. An optional user interface 160 enables a user to transmit instructions and receive information, as further described below. The controller 150 is not limited by the materials from which it is formed or the processing mechanisms employed therein and, as such, may be implemented via semiconductor(s) and/or transistors (e.g., electronic integrated circuits (ICs)), and so forth.

In certain embodiments, user interface 160 includes one or more buttons or switches located in a vehicle cabin for controlling the display device 130. In some embodiments, user interface 160 includes a touch screen display device configured for receiving touch indications by the user. The touch screen display device may be located in the vehicle cabin and/or accessed remotely via a mobile device (e.g., smartphone, tablet, or laptop computer). User interface 160 may be configured to present a menu for selecting visual content to be displayed via display device 130. User interface 160 may be configured to accept text input for enabling a user to write personalized messages (e.g., welcome messages), stored in memory 154, for illumination via display device 130. For example, customizable markings and a welcome function may be programmed in controller 150 by a user via user interface 160.

In certain embodiments, controller 150 is optionally coupled communicatively with other vehicle subsystems 170. This enables automatic display of visual content that relies upon, or is related to, information provided by other systems of the vehicle. For example, display device 130 may present a low fuel alert or a low battery charge alert that is triggered by a fuel gauge or a battery charge meter onboard the vehicle. In an embodiment, when a user unlocks the vehicle doors via a key fob, display device 130 illuminates a symbol, feature, or message so as to remind the user to refuel or recharge the battery.

System 400, FIG. 4 provides control of integrated display light assembly 100, which includes outer lens 110, lamp housing 120, and display device 130 of FIG. 1, and optionally a light source 140. Examples of light source 140 include inner and outer pairs of light sources 141, 142 of FIG. 3. Communication between user interface 160, controller 150, other vehicle subsystems 170, and light assembly 100 may be by a wired and/or wireless communication media. For example, controller 150 may include a transmitter/receiver, a multi-channel input/output (I/O) data bus, or the like (not shown) for communicatively coupling with user interface 160 and light assembly 100.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An integrated display-light assembly for a vehicle, comprising:
   a lamp housing configured to mechanically support an outer lens;
   a light source positioned within the lamp housing behind a first portion of the outer lens, wherein the lamp housing and the light source provide a rear combination lamp for a vehicle;
   a display device positioned within the lamp housing behind a second portion of the outer lens, different than the first portion, wherein the display device illuminates a changeable visual content visible through the outer lens; and
   a controller for controlling the changeable visual content such that the controller instructs the display device to illuminate the changeable visual content when doors of the vehicle are unlocked from a key fob.

2. The integrated display-light assembly of claim 1, further comprising a user interface for providing inputs to the controller for changing the changeable visual content.

3. The integrated display-light assembly of claim 2, wherein the user interface is provided via a mobile device.

4. The integrated display-light assembly of claim 1, wherein the changeable visual content comprises customizable markings.

5. The integrated display-light assembly of claim 4, wherein the customizable markings include a welcome function programmed via the user interface.

6. The integrated display-light assembly of claim 1, wherein the display device displays license plate and registration information for the vehicle.

7. An integrated display-light assembly for a vehicle, comprising:
   a lamp housing configured to mechanically support an outer lens;
   a light source positioned within the lamp housing behind a first portion of the outer lens, wherein the lamp housing and the light source provide a rear combination lamp for a vehicle;
   a display device positioned within the lamp housing behind a second portion of the outer lens, different than the first portion, wherein the display device illuminates a changeable visual content visible through the outer lens; and
   the changeable visual content is based on inputs received from other vehicle subsystems, wherein one of the other vehicle subsystems comprises a fuel gauge and the changeable visual content provides a low fuel alert.

8. The integrated display-light assembly of claim 5, wherein the controller instructs the display device to display the welcome function when doors of the vehicle are unlocked from a key fob.

9. An external vehicle lamp assembly, comprising:
   a display device adapted for displaying digital images received from a controller;
   a light source located adjacent the display device for providing an automotive lighting function;
   an outer lens positioned externally beside the display device and the light source for providing protection from external environmental conditions;
   a lamp housing adapted to support the display device, the light source, and the outer lens, thereby providing dual functions of 1) displaying digital images and 2) providing the automotive lighting function in the external vehicle lamp assembly; and
   the display device provides a digital image to indicate a status of the vehicle, wherein the digital images are based on inputs received from other vehicle subsystems, and one of the other vehicle subsystems comprises a battery charge meter such that the digital image indicates a low-charge battery status.

10. The external vehicle lamp assembly of claim 9, further comprising a user interface for providing inputs to the controller for changing the digital images.

11. The external vehicle lamp assembly of claim 10, wherein the user interface is part of a mobile device.

12. The external vehicle lamp assembly of claim 9, wherein the digital images comprise customizable markings.

13. The external vehicle lamp assembly of claim 12, wherein the customizable markings include a welcome function programmed via the user interface.

14. The external vehicle lamp assembly of claim 9, wherein the display device displays license plate and registration information for the vehicle.

15. The external vehicle lamp assembly of claim 9, wherein the lamp housing and the light source provide a rear combination lamp for a vehicle.

16. The external vehicle lamp assembly of claim 9, wherein the digital images are based on inputs received from other vehicle subsystems.

17. The external vehicle lamp assembly of claim 16, wherein one of the other vehicle subsystems comprises a fuel gauge and the digital image provides a reminder when the fuel gauge indicates a low fuel status.

18. The external vehicle lamp assembly of claim 9, wherein the controller instructs the display device to display a custom message when doors of the vehicle are unlocked from a key fob.

19. The integrated display-light assembly of claim 1, wherein the changeable visual content provides a low fuel alert.

* * * * *